(12) United States Patent
Hwang et al.

(10) Patent No.: US 6,817,078 B2
(45) Date of Patent: Nov. 16, 2004

(54) APPARATUS FOR AND METHOD OF MANUFACTURING A COLLIMATOR

(75) Inventors: Myeon-soon Hwang, Suwon (KR);
Tai-hwan Park, Suwon (KR);
Hong-suk Sun, Suwon (KR);
Kyeong-won Lim, Suwon (KR);
Byung-gon Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 120 days.

(21) Appl. No.: 10/259,765

(22) Filed: Sep. 30, 2002

(65) Prior Publication Data

US 2003/0150102 A1 Aug. 14, 2003

(Under 37 CFR 1.47)

(30) Foreign Application Priority Data

Feb. 14, 2002 (KR) .................................... 2002-0007993

(51) Int. Cl.$^7$ ............................................... B23Q 3/00
(52) U.S. Cl. ............................... 29/407.01; 29/407.09; 29/407.1; 29/464; 29/559; 29/721; 29/785; 29/281.1; 29/281.4; 29/281.5; 385/76; 385/78

(58) Field of Search .................... 29/407.61, 407.67, 29/407.69, 407.1, 559, 388, 564.1, 335, 720, 721, 785, 792, 231.1, 231.4, 231.5, 444, 822, 824, 799, 430, 760, 761; 385/33, 34, 88–93, 137, 52, 174, 76, 77, 78, 66, 84

(56) References Cited

U.S. PATENT DOCUMENTS

| | | | |
|---|---|---|---|
| 3,154,865 A | * 11/1964 | Conner | 434/224 |
| 5,446,815 A | * 8/1995 | Ota et al. | 385/33 |
| 5,724,723 A | * 3/1998 | Saliba et al. | 29/754 |
| 5,841,591 A | 11/1998 | Zhu et al. | |
| 6,148,126 A | 11/2000 | Zheng | |
| 6,168,319 B1 | * 1/2001 | Francis | 385/79 |
| 6,340,248 B1 | * 1/2002 | Naor | 385/79 |
| 6,404,955 B1 | * 6/2002 | Kikuchi et al. | 385/35 |

* cited by examiner

Primary Examiner—David P. Bryant
Assistant Examiner—Jermie E. Cozart
(74) Attorney, Agent, or Firm—Staas & Halsey LLP

(57) ABSTRACT

An automatic collimator manufacturing apparatus includes a loading part being loaded a glass tube, into which a GRIN lens is fixedly inserted, and a pigtail formed with at least one fiber, an angle aligning part allowing the pigtail to be inserted into the glass tube and coaxially aligning the pigtail with the GRIN lens, a spot aligning part controlling an optical property between the pigtail and the GRIN lens, and a dispensing part fixedly attaching the pigtail to the glass tube.

23 Claims, 10 Drawing Sheets

APPARATUS FOR AND METHOD OF MANUFACTURING A COLLIMATOR

CROSS-REFERENCE TO RELATED APPLICATIONS

This application claims priority to Korean Application No. 2002-7993, filed Feb. 14, 2002, in the Korean Industrial Property Office, the disclosure of which is incorporated herein by reference.

BACKGROUND OF THE INVENTION

1. Field of the Invention

The present invention relates to an apparatus for and a method of manufacturing a collimator, and more particularly, to an apparatus for and a method of automatically assembling a pigtail and a glass tube having a gradient index lens into a collimator.

2. Description of the Related Art

A so-called collimator refers to an optical communication device, which transforms light received from a light source into a beam of parallel rays. The collimator is usually employed, as a component, in a variety of equipment, such as optical communication equipment, semiconductor equipment and so on.

A general collimator 10, as shown in FIG. 1, includes a pigtail 12 and a GRIN (gradient index) lens, both being mutually arranged on a coaxial line, a glass tube 15 receiving and supporting the pigtail 12 and the GRIN lens 14, and a metal sleeve 16 formed on an outside of the glass tube 15 to protect the glass tube 15.

In the pigtail 12 made of glass is provided at least one fiber 13 forming an incidence channel of light in one end of the pigtail 12, through which the light is transmitted. In the other end of the pigtail 12 is formed a first inclined side 12a oblique to the coaxial line.

In one end of the GRIN lens 14 displaced coaxially with the pigtail 12 is formed a second inclined side 14a corresponding to the first inclined side 12a of the pigtail 12. The first inclined side 12a of the pigtail 12 and the second inclined side 14a of the GRIN lens 14 are disposed to be parallel and to face each other.

To manufacture the collimator 10 with this configuration, the GRIN lens 14 is fixedly inserted into the glass tube 15. The one end of the GRIN lens 14, on which the second inclined side 14a is formed, is inserted into the glass tube 15 and the other end thereof protrudes from the glass tube 15 by a predetermined distance to be exposed to an outside of the glass tube 15.

If the GRIN lens 14 is supportedly received in one side of the glass tube 15, the pigtail 12 is inserted thereinto from the other side thereof. The other end of the pigtail 12, on which the first inclined side 12a is formed, is received within the glass tube 15 and then the first inclined side 12a of the pigtail 12 is disposed to face the second inclined side 14a of the GRIN lens 14 already supportedly inserted within the glass tube 15.

The first inclined side 12a of the pigtail 12 is disposed to be parallel to the second inclined side 14a of the GRIN lens 14 through a manually aligning process to comply with predetermined conditions for optical properties of the collimator 10. Thereafter, if the collimator 10 complies with the predetermined conditions, the pigtail 12 is fixed within the glass tube 15.

If the GRIN lens 14 and the pigtail 12 are supportedly received within the glass tube 15, the glass tube 15 is inserted into the tube-shaped metal sleeve 16. Then, the glass tube 15 and the metal sleeve 16 are coated with an epoxy resin 17, and they are fixedly combined with each other. With these processes, the manufacturing of the collimator 10 is completed.

However, since the conventional collimator 10 is manually manufactured, a production efficiency is remarkably reduced, and product reliability is also decreased accordingly. In addition, a relatively long time period is required to produce the collimator. As a result, productivity of the collimator 10 is remarkably reduced.

SUMMARY OF THE INVENTION

The present invention has been made to overcome the above and other problems, and an object of the present invention is to provide an apparatus for and a method of automatically manufacturing a collimator.

Another object of the present invention is to provide an apparatus for and a method of automatically manufacturing a collimator of which a product reliability increases and of which a productivity is improved by shortening a manufacturing time period.

Additional objects and advantages of the invention will be set forth in part in the description which follows and, in part, will be obvious from the description, or may be learned by practice of the invention.

These and other objects of the present invention may be achieved by providing an apparatus for manufacturing a collimator. The collimator manufacturing apparatus includes a loading part being loaded with a glass tube, into which a GRIN lens is fixedly inserted, and a pigtail formed with at least one fiber, an angle aligning part allowing the pigtail to be inserted into the glass tube and aligning the pigtail and the GRIN lens coaxially, a spot aligning part controlling the pigtail with respect to the GRIN lens to have a desired optical property, with which the first inclined side of the pigtail is aligned with the second inclined side of the GRIN lens, and a dispensing part attaching the pigtail to the glass tube when the angle and spot alignments of the pigtail with the GRIN lens are completed.

According to an aspect of the present invention, the apparatus includes a disk-shaped rotatable turn table, wherein the loading part, the angle aligning part, the spot aligning part and the dispensing part are disposed on a circumference along the turntable.

According to another aspect of the present invention, the apparatus includes a station controlling part controlling the angle aligning part, the spot aligning part and the dispensing part according to a rotation operation of the turntable so as to allow an angle aligning operation, a spot aligning operation and a dispensing operation to be performed.

According to another aspect of the present invention, the loading part includes a tube holder supporting the glass tube into which the GRIN lens is fixedly inserted, a pigtail holder provided in an upper side of the tube holder to chuck the pigtail, and a rotation moving part moving and rotating the pigtail holder toward the tube holder.

According to another aspect of the present invention, the angle aligning part and the spot aligning part respectively include an image displaying part displaying an angle aligning state and a spot aligning state between the pigtail and the GRIN lens.

According to another aspect of the present invention, the dispensing part includes an adhesive spraying part spraying an adhesive into a space between the glass tube and the pigtail.

According to another embodiment of the present invention, these and other objects may also be achieved by providing a method of manufacturing a collimator having a glass tube, a GRIN lens, and a pigtail having at least one fiber. The method includes inserting the GRIN lens into the glass tubes, loading the glass tube and the pigtail, inserting the pigtail into the glass tube and aligning the pigtail and the GRIN lens coaxially, controlling an optical property between the pigtail and the GRIN lens, and attaching the pigtail to the glass tube.

BRIEF DESCRIPTION OF THE DRAWINGS

These and other objects and advantageous of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
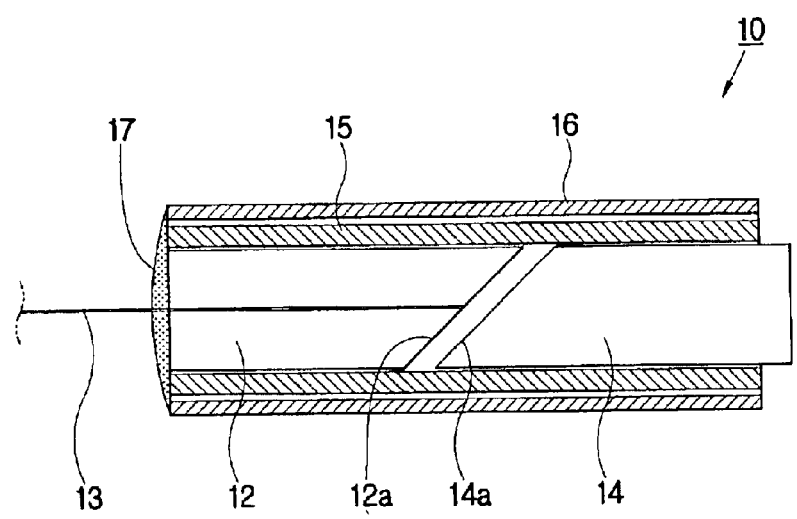
FIG. 1 is a sectional view of a collimator.

Reference will now be made in detail to the present preferred embodiments of the present invention, examples of which are illustrated in the accompanying drawings, wherein like reference numerals refer to the like elements throughout. The embodiments are described in order to explain the present invention by referring to the figures.

Hereinafter, an embodiment of the present invention will be described in more detail with reference to the accompanying drawings. Since the present invention includes the elements of FIG. 1 described above, any description in this regard will be incorporated with FIG. 1. The same elements and components with respect to FIG. 1 will be assigned the same reference numerals.

Figure 2:
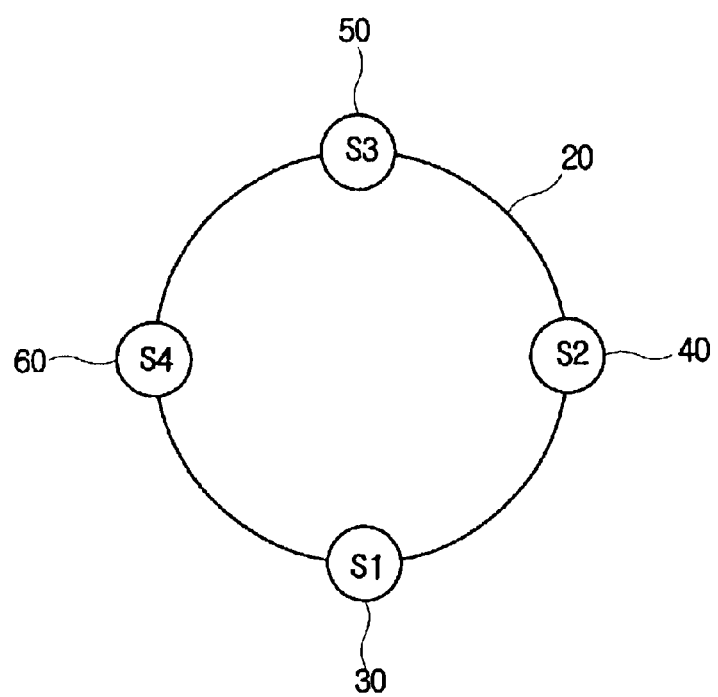
FIG. 2 is a schematic view showing an apparatus for automatically manufacturing the collimator according to an embodiment of the present invention.
Figure 3:
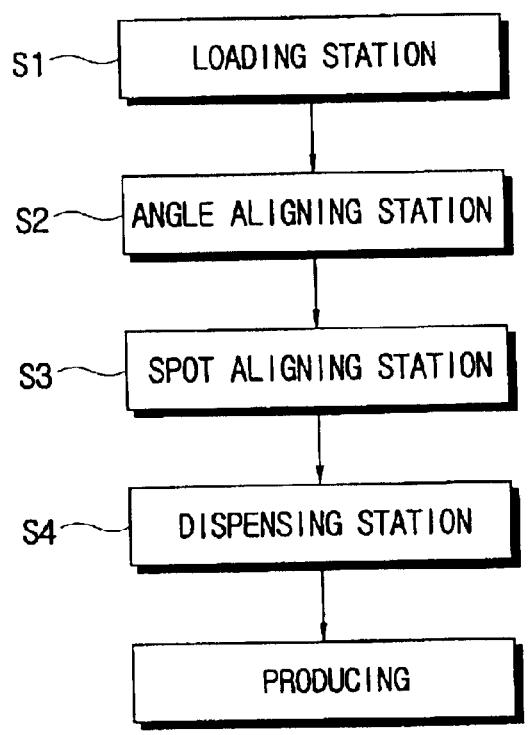
FIG. 3 is a flow chart showing a method of automatically manufacturing the collimator in the collimator manufacturing apparatus of FIG. 2.

As shown in FIGS. 2 and 3, an apparatus for automatically manufacturing a collimator includes a turntable 20 having a rotatable disc shape. The apparatus includes a loading part 30, an angle aligning part 40, a spot aligning part 50 and a dispensing part 60 displaced along a circumference of the turn table 20 to respectively perform a loading operation in a loading station S1, an angle aligning operation in an angle aligning station S2, a spot aligning operation in a spot aligning station S3 and a dispensing operation in a dispensing station S4 in sequence.

Figure 8:
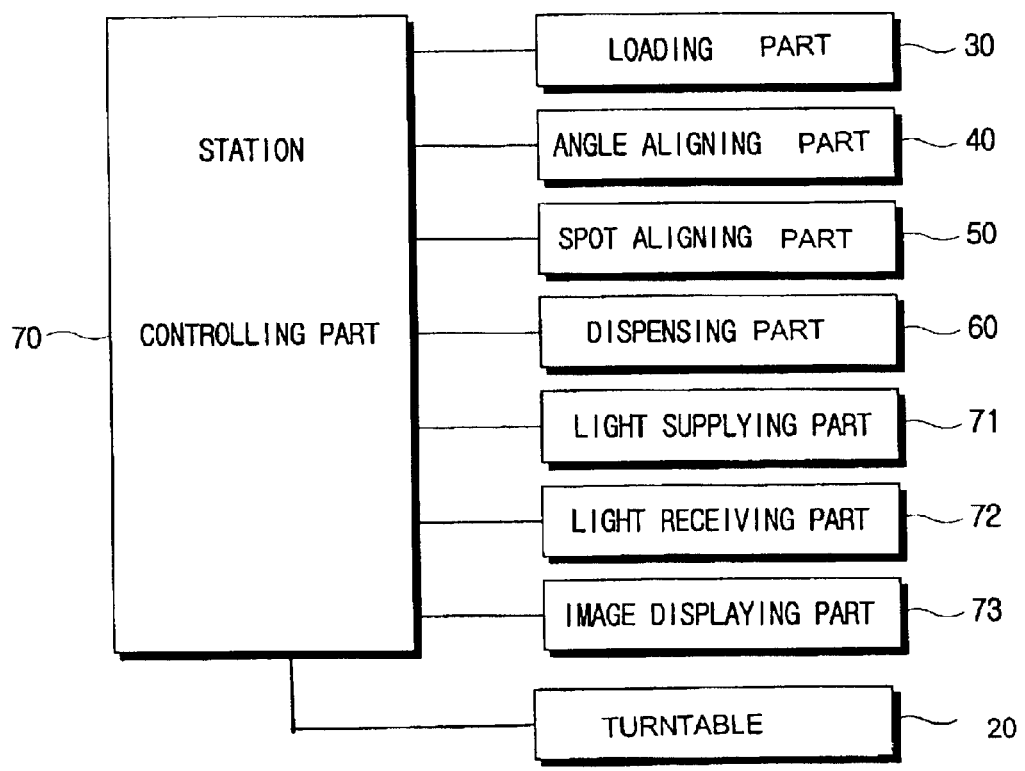
FIG. 8 is a control block diagram controlling a turntable, the loading part, the angle aligning part, the spot aligning part, and the dispensing part of the collimator manufacturing apparatus of FIG. 3.

The loading part 30, the angle aligning part 40, a spot aligning part 50 and the dispensing part 60, in addition to a rotation operation of the turntable 20, are controlled by a station controlling part 70 of FIG. 8.

Figure 4:
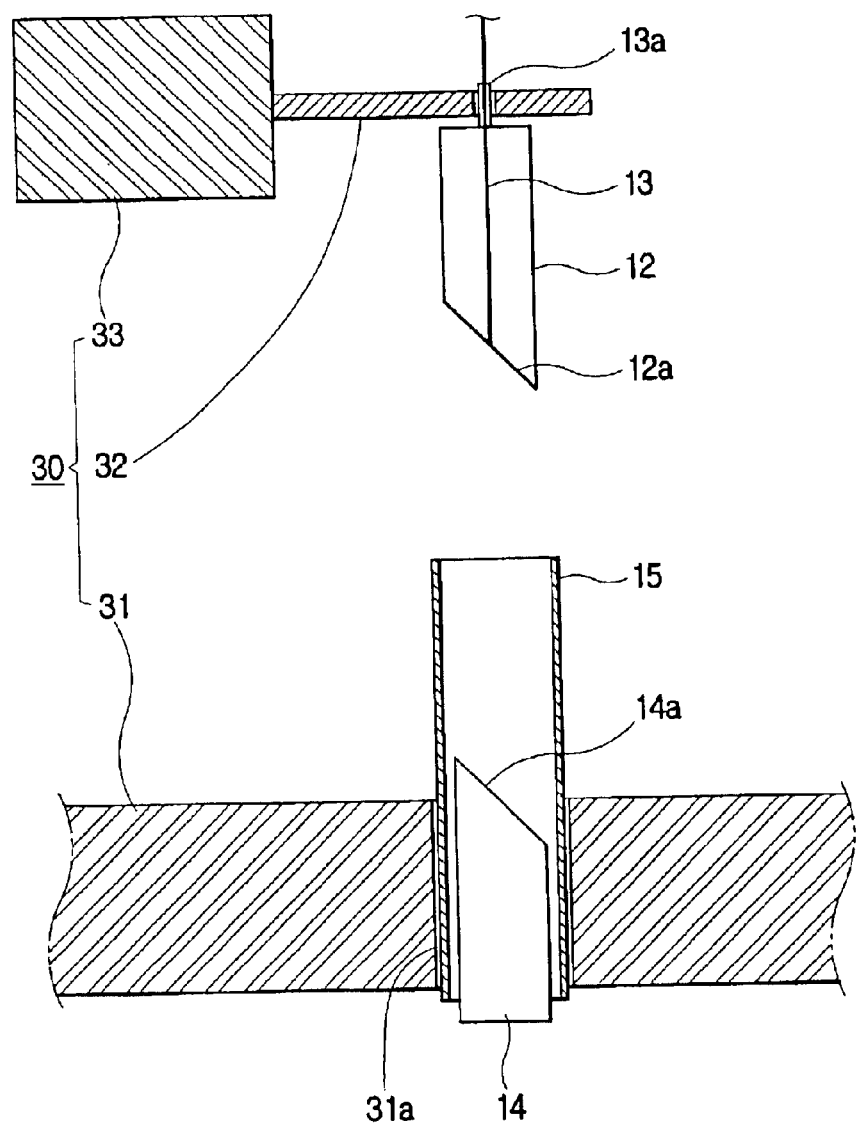
FIG. 4 is a schematic view showing a loading part of FIG. 3.

As illustrated in FIG. 4, the loading part 30 includes a tube holder 31 supporting the glass tube 15, a pigtail holder 32 disposed over the tube holder 31 to hold the pigtail 12 having a first inclined side 12a, and a rotation moving part 33 moving vertically and rotating the pigtail holder 32 toward the tube holder 31.

The tube holder 31, the pigtail holder 32, and the rotation moving part 33 are mounted on the turntable 20. When the station controlling part 70 rotates the turntable 20 to move the tube holder 31, the pigtail holder 32, and the rotation moving part 33 to the loading station S1, the angle aligning station S2, the spot aligning station S3, and the dispensing station S4 sequentially, the station controlling part 70 controls the loading part 30, the angle aligning part 40, the spot aligning part 50, and the dispensing part 60 to perform the loading operation, the angle aligning operation, the spot aligning operation, and the dispensing operation, respectively.

A GRIN (gradient index) lens 14 is inserted into and fixed within the glass tube 15 supported by the tube holder 31. One end of the GRIN lens 14, on which a second inclined side 14a is formed, is disposed within the glass tube 15, and the other end thereof protrudes from the glass tube 15 by a distance to be exposed to an outside of the glass tube 15 . A position of the GRIN lens 14 is adjusted with respect to the glass tube 15 when the GRIN lens 14 is attached to the glass tube 15 by using an adhesive, such as an epoxy resin.

The pigtail holder chucks and controls a supporting tube (chuck) 13a to hold and support the fiber 13 of the pigtail 12. Like the GRIN lens 14 and the glass tube 15, the pigtail 12 is generally formed of glass, and for this reason, the pigtail 12 may be damaged when the pigtail holder 32 chucks and holds the pigtail 12. In an embodiment of the present invention, the supporting tube 13a is provided in the pigtail holder 32 to hold and support the fiber 13. At this time, the fiber 13 of the pigtail 12 supported by the pigtail holder 32 is connected to a light supplying part 71 of FIG. 5A.

The tube holder 31 includes a support receiving part 31a supporting the glass tube 15. As illustrated, the support receiving part 31a may have a shape of a passing hole or pincers to thereby allow the support receiving part 31a to support and hold the glass tube 15. In all of these cases, preferably a buffering rubber (not shown) is disposed in the support receiving part 31a to prevent the glass tube 15 from being damaged while being supported.

In the loading station S1, supporting processes of supporting the glass tube 15 in the support receiving part 31a of the tube holder 31 and supporting the fiber 13 of the pigtail 12 in the supporting tube 13a of the pigtail holder 32 may be automatically performed by using an industrial robot. However, such supporting processes of the glass tube 15 and the fiber 13 of the pigtail 12 are manually performed in this embodiment of the present invention.

The tube holder 31 holding the glass tube 15, the pigtail holder 32 holding the fiber 13, and the rotation moving part 33 coupled to the pigtail holder 32 are forwarded to the angle aligning station S2, and the station controlling part 70 controls the angle aligning part 40 to perform the angle aligning operation.

Figure 5A:
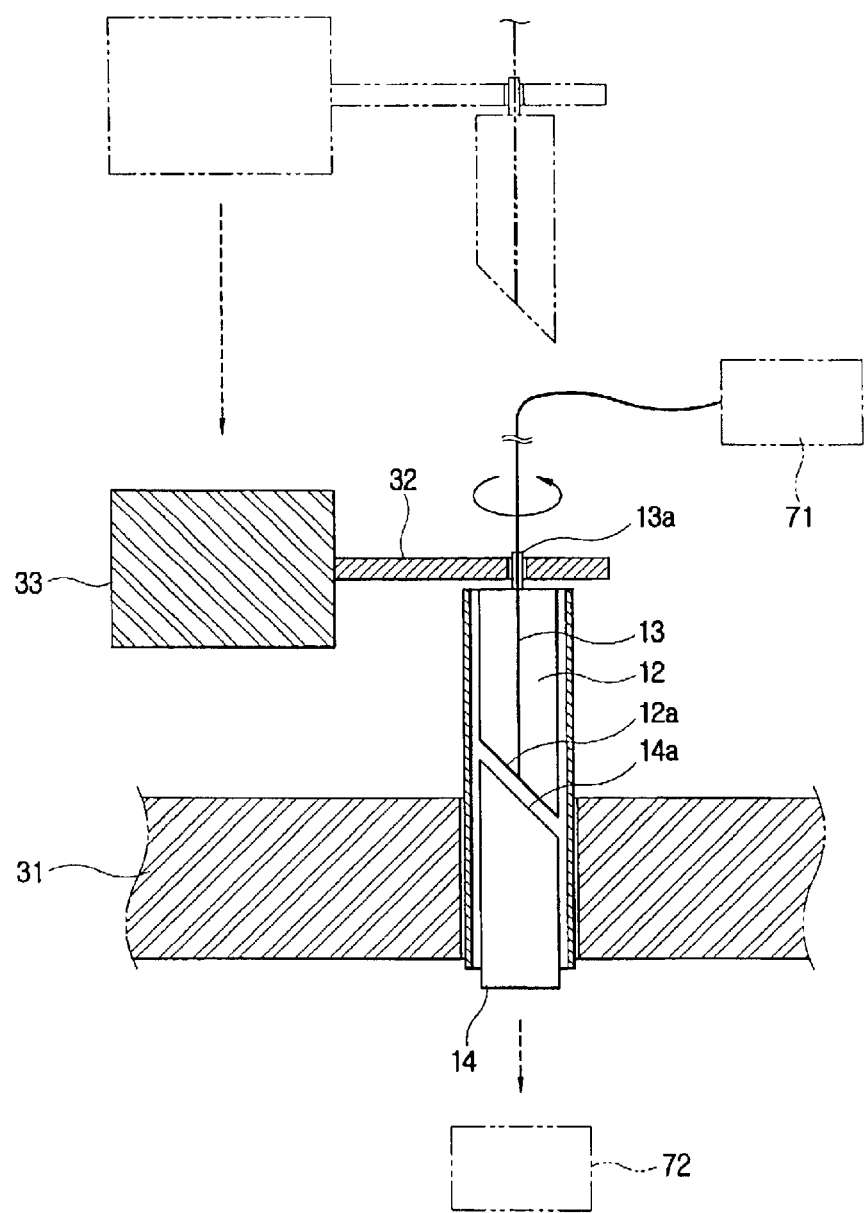
FIGS. 5A and 5B are schematic views showing an angle aligning part of FIG. 3.

The angle aligning part 40 is, as shown in FIG. 5A, operated with the rotation moving part 33 moving and rotating the pigtail holder 32 supporting the pigtail 12 relative to the tube holder 31 supporting the glass tube 15. The pigtail 12 moved down by the rotation moving part 33 and then inserted into the glass tube 15 is preferably arranged such that the first inclined side 12a is disposed to have an interval with and in a direction appropriate to the second inclined side 14a of the GRIN lens 14 already fixed within the glass tube 15.

The angle aligning part 40 is provided with a light supplying part 71 and a light receiving part 72 both coupled to the station controlling part 70 to perform the angle aligning operation. The light supplying part 71 and the light receiving part 72 may be movably mounted on the turntable 20 or disposed on the circumference around the turntable 20 in the angle aligning station S2. If one of the light supplying part 71 and the light receiving part 72 is mounted on the turntable 20, the one of the light supplying part 71 and the light receiving part 72, the tube holder 31, the pigtail holder 32, and the rotation moving part 33 are forwarded to the angle aligning part 40, the spot aligning part 50, and the dispensing part 60 sequentially when the station controlling part 70 rotates the turntable 20. If the light supplying part 71 and the light receiving part 72 are not mounted on the turntable 20 but stationary in the angle aligning station S2, the fiber 13 and the glass tube 15 are rotated to be disposed to correspond to the light supplying part 71 and the light receiving part 72, respectively when the turntable is rotated by the station controlling part 70.

For this purpose, a light supplying part 71 generating light supplies the light to the fiber 13 of the pigtail 12, and the light passing through the fiber 13 then passes through the pigtail 12 and the GRIN lens 14 and is received in a light receiving part 72 coupled to the controlling part 70 of FIG. 8. At this time, the light receiving part 72 displays the light signals received through the controlling part 70 on an image displaying part 73, thereby allowing a user to visibly discriminate the light signals.

Figure 5B:
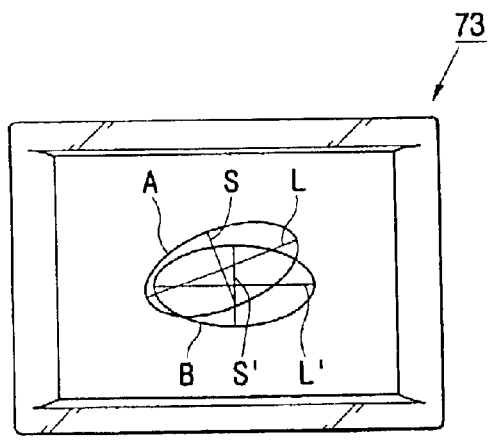

FIG. 5B shows an image displayed on the image displaying part 73 in the angle aligning station S2 to align a relative position between the GRIN lens 14 and the pigtail 12. To complete the angle aligning operation between the GRIN lens 14 and the pigtail 12, a first oval image A of the first inclined side 12a of the pigtail 12 and a second oval image B of the second inclined side 14a of the GRIN lens 14 should be identical to each other in a predetermined range of allowable errors.

Thus, the controlling part 70 controls the rotation moving part 33 to allow the first oval image A from the pigtail 12 and the second oval image B from the GRIN lens 14 to be identical to each other. As a result of operation of the rotation moving part 33 by the controlling part 70, comparison of long axes (L, L') and short axes (S, S') of the first and second oval images (A, B) are displayed on the image displaying part 73, thereby allowing the user to visibly monitor the first and second oval images A and B.

Figure 6A:
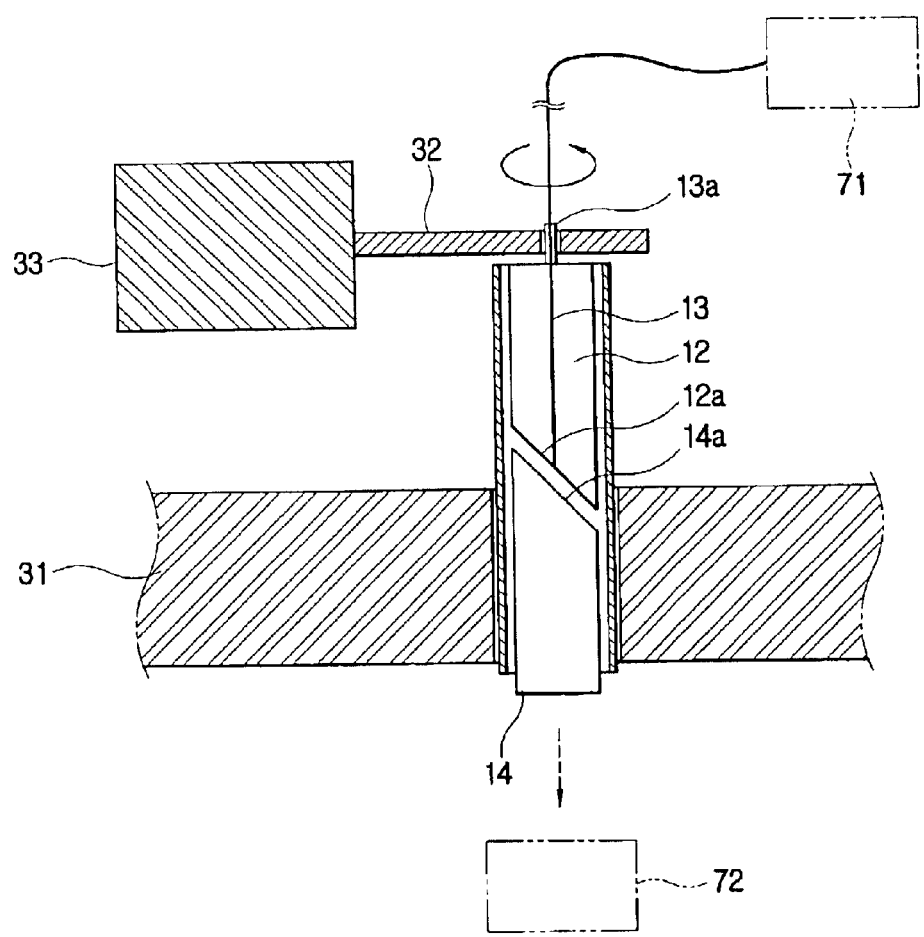
FIGS. 6A and 6B are schematic views showing a spot aligning part of FIG. 3.

As depicted in FIG. 6A, the spot aligning part 50 controls optical properties between the pigtail 12 and the GRIN lens 14 by rotating the pigtail 12 inserted within the glass tube 15 to a predetermined angle with respect to the GRIN lens 14. The spot aligning station S3 requires the light supplying part 71 supplying light to the fiber 13 of the pigtail 12 and the light receiving part 72 receiving therein the supplied light passing through the pigtail 12 and the GRIN lens 14.

Figure 6B:
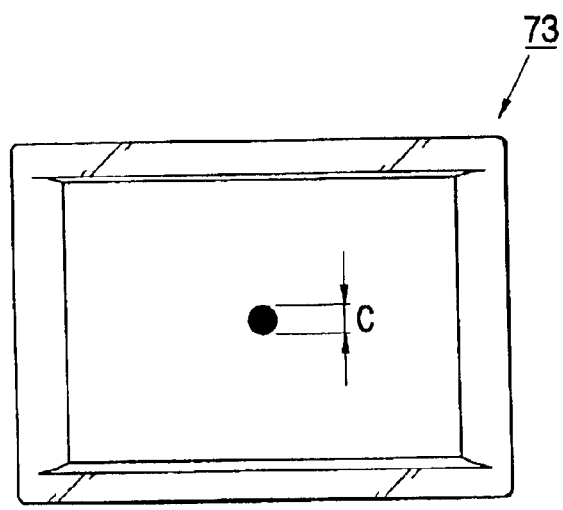

Also in the spot aligning station S3, the above processes are displayed on the image displaying part 73 so as to allow the user to monitor and determine a spot aligning state. FIG. 6B shows the spot aligning state displayed in the image displaying part 73.

By the way, since the collimator 10 is a device for converting light into a beam of parallel rays, the light transmitted into the fiber 13 is emitted outward in parallel after passing through the pigtail 12 and the GRIN lens 12. Such a property can be displayed in a spot as shown in FIG. 6B.

Relative to a shape of the spot appearing on the image displaying part 73, a diameter C thereof can be a reference for inspection. The controlling part 70 compares the shape of the spot received in the spot aligning operation S3 with a predetermined reference size and shape and again controls the rotation moving part 33 to allow the shape of the spot appearing on the image displaying part 73 to be adjusted within the predetermined range of allowable errors. These processes are all displayed on the image displaying part 73, thereby enabling the user to visibly monitor the processes.

Figure 7:
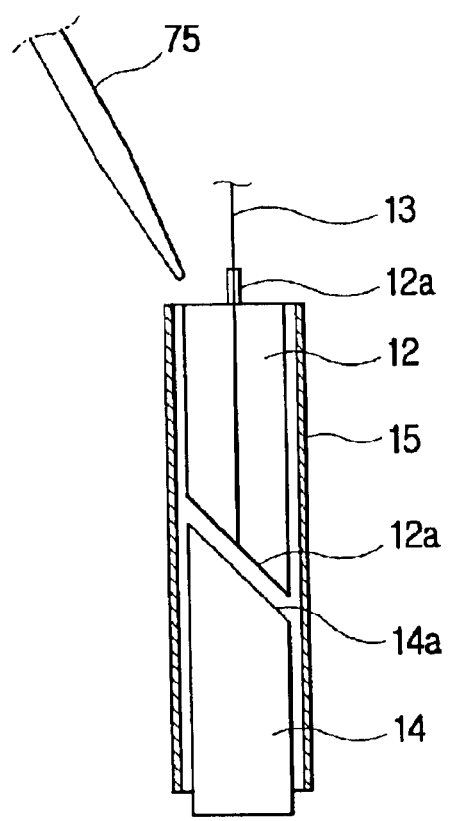
FIG. 7 is a schematic view showing a dispensing part of FIG. 3.

If the angle and the spot aligning operations in the angle and spot aligning stations S2 and S3 are completed after the pigtail 12 is inserted into the glass tube 15, the pigtail 12 is fixed within the glass tube 15 by the dispensing part 60. For this purpose, an adhesive spraying member 75 of FIG. 7 is provided. The adhesive spraying member 75 sprays an adhesive into a space between the glass tube 15 and the pigtail 12. If the adhesive, such as an epoxy resin, is inserted into the space between the glass tube 15 and the pigtail 12 by using the adhesive spraying member 75, the pigtail 12 can be fixedly attached to the glass tube 15.

Hereinafter, a controlling method of the controlling part 70 in the loading, angle aligning, spot aligning and dispensing stations S1, S2, S3 and S4 described above will be described.

The turn table 20 is rotated to a predetermined angle toward a loading position by the controlling part 70, and then the loading part 30 is disposed in front of the user. The glass tube 15 is inserted into and supported by the tube holder 31, and the supporting tube 13a of the pigtail 12 is inserted into and supported by the pigtail holder 32. The fiber 13 of the pigtail 12 is connected to the light supplying part 71.

If the loading operation in the loading station S1 is finished, the controlling part 70 rotates the turntable 20 to the angle aligning station S2 so as to allow the angle aligning part 40 to perform the spot aligning operation. The controlling part 70 controls the rotation moving part 33 to allow the pigtail 12 to be inserted into the glass tube 15. At this time, the light supplied to the fiber 13 from the light supplying part 71 is transmitted to the light receiving part 72 through the pigtail 12 and the GRIN lens 14. The controlling part 70 controls the rotation moving part 33 to allow the first inclined side 12a of the pigtail 12 to be disposed to have an appropriate interval and direction relative to the second inclined side 14a of the GRIN lens 14 which has been already fixedly attached to the glass tube 15. These processes are displayed as images on the image displaying part 73, and therefore, the user can visibly monitor the angle aligning process.

If the angle aligning operation in the angle aligning station S2 is completed, the controlling part 70 rotates the turntable 20 to the spot aligning station S3 to control the spot aligning part 50 to perform the spot aligning operation. To control optical properties (the predetermined reference size and shape) of the light transmitted into the light receiving part 72 from the light supplying part 71 through the pigtail 12 and the GRIN lens 14, the controlling part 70 again controls the rotation moving part 33 to thereby control a displacement state of the pigtail 12 relative to the GRIN lens 14. These processes are also displayed as images on the image displaying part 73.

If the angle and spot aligning operations in the angle aligning and spot aligning stations S2 and S3 are completed, the controlling part 70 again rotates the turn table 20 to the dispensing station S4 to control the dispensing part 60 to perform the dispensing operation. That is, if the angle aligning and the spot aligning of the pigtail 12 relative to the GRIN lens 14 are completed, the controlling part 70 controls the dispensing part 60 to attach the pigtail 12 to the glass tube 15. Accordingly, the adhesive spraying member 75 provided in the dispensing part 60 is operated to spray the adhesive into the space between the pigtail 12 and the glass tube 15. If a predetermined period of time passes after the adhesive has been sprayed, the pigtail 12 is fixedly attached to the glass tube 15.

If the dispensing operation in the dispensing station S4 is completed, the controlling part 70 rotates the turntable 20 to thereby remove the collimator 10 from the apparatus.

In this way, according to the embodiment of the present invention, the loading part 30, the angle aligning part 40, the spot aligning part 50 and the displaying part 60 are disposed in the turn table 20 to enable the apparatus to perform an automatic and continuous manufacturing process of the collimators 10 according to control by the controlling part 70.

As described above, there is provided an apparatus for and a method of automatically manufacturing collimators.

Also, since product reliability increases, and since a manufacturing time period is shortened, productivity of the manufacturing apparatus is enhanced.

Although a few preferred embodiments of the present invention have been shown and described, it would be appreciated by those skilled in the art that changes may be made in this embodiment without departing from the principles and sprit of the invention, the scope of which is defined in the claims and their equivalents.

What is claimed is:

1. An apparatus for automatically manufacturing a collimator, comprising:
   a loading part being loaded with a glass tube, a GRIN lens fixedly inserted into the glass tube, and a pigtail formed with at least one fiber;
   an angle aligning part moving the pigtail to be inserted into the glass tube, and rotating for coaxial alignment of the pigtail with the GRIN lens;
   a spot aligning part controlling an optical property between the pigtail and the GRIN lens when the coaxial alignment of the pigtail with the GRIN lens is completed; and
   a dispensing part fixedly attaching the pigtail to the glass tube when the coaxial alignment and the optical property controlling are completed.

2. The apparatus according to claim 1, further comprising a disk-shaped rotatable turntable, wherein the loading part, the angle aligning part, the spot aligning part and the dispensing part are disposed on a circumference along the turn table.

3. The apparatus according to claim 2, further comprising a controlling part controlling the angle aligning part, the spot aligning part and the dispensing part according to a rotation of the turntable to perform an angle aligning operation, a spot aligning operation and a dispensing operation.

4. The apparatus according to claim 3, wherein the angle aligning part and the spot aligning part respectively comprise an image displaying part displaying an angle aligning state and a spot aligning state between the pigtail and the GRIN lens.

5. The apparatus according to claim 3, wherein the dispensing part comprises an adhesive spraying part spraying an adhesive into a space between the glass tube and the pigtail.

6. The apparatus according to claim 1, wherein the loading part comprises:
   a tube holder supporting the glass tube into which the GRIN lens is fixedly inserted;
   a pigtail holder provided in an upper side of the tube holder to hold and support the pigtail; and
   a rotation moving part moving and rotating the pigtail holder toward the tube holder.

7. The apparatus according to claim 1, wherein the angle aligning part and the spot aligning part respectively comprise an image displaying part displaying an angle aligning state and a spot aligning state between the pigtail and the GRIN lens.

8. The apparatus according to claim 1, wherein the dispensing part comprises an adhesive spraying part spraying an adhesive into a space between the glass tube and the pigtail.

9. A method of automatically manufacturing a collimator having a glass tube, a GRIN lens, a pigtail, and a fiber extended from the pigtail, the method comprising:
   loading the glass tube and the pigtail using a turntable and a loading part mounted on the turntable;
   inserting the pigtail into the glass tube and coaxially aligning the pigtail with the GRIN lens using an angle aligning part holding the fiber of the pigtail and moving in a direction parallel to the glass tube;
   moving the turntable and controlling an optical property between the pigtail and the GRIN lens using a spot aligning part moving the fiber with respect to the glass tube; and
   moving the turntable and fixedly attaching the pigtail to the glass tube.

10. An apparatus for automatically manufacturing a collimator having a glass tube, a GRIN lens fixedly inserted into the glass tube, and a pigtail formed with at least one fiber, comprising:
    a turntable mounted with a tube holder, a pigtail holder, and a rotation moving part coupled to the pigtail holder;
    a loading part controlling the tube holder to hold and support the glass tube having the GRIN lens, the pigtail holder to hold and support the pigtail, and the rotation moving part to move the pigtail holder with respect to the tube holder;
    an angle aligning part controlling the rotation moving part to move the pigtail to be inserted into the glass tube and coaxially aligned with the GRIN lens;
    a spot aligning part controlling the rotation moving part to adjust the pigtail with respect to the GRIN lens to have a predetermined optical property;
    a dispensing part fixedly attaching the pigtail to the glass tube when the coaxially aligning and the optical property controlling are completed; and
    a controller controlling the turntable to move around the loading part, the angle aligning part, the spot aligning part, and dispensing part.

11. The apparatus according to claim 10, wherein the loading part, the angle aligning part, the spot aligning part, and the dispensing part are disposed on a circumference around the turntable at predetermined interval.

12. The apparatus according to claim 10, wherein the controller controls the rotation moving part to move with respect to the tube holder.

13. The apparatus according to claim 10, wherein the controller controls the turntable to rotate to move the tube holder, the pigtail holder, and the rotation moving part to the angle aligning part, the spot aligning part, and the dispensing part, sequentially.

14. The apparatus according to claim 10, wherein the dispensing part comprises an adhesive, and the controller controls the dispensing part to inject to the adhesive into a space between the glass tube and the pigtail when the tube holder, the pigtail holder, and the rotation moving part are moved to the dispensing part.

15. The apparatus according to claim 10, wherein the tube holder comprises a support receiving part made of a rubber material to hold and support the glass tube.

16. The apparatus according to claim 10, wherein the tube holder comprises a support receiving part having a shape corresponding to the glass tube to protect the glass tube.

17. The apparatus according to claim 10, wherein the pigtail holder comprises a supporting tube buffering between the fiber and the pigtail holder to prevent the fiber from being damaged.

18. The apparatus according to claim 10, wherein the apparatus comprises an industrial robot disposed adjacent to the loading part to insert the fiber into the pigtail holder and the glass tube into the tube holder.

19. The apparatus according to claim 10, wherein the angle aligning part comprises a light supplying part and a light receiving part disposed corresponding to the fiber and the GRIN lens, respectively, and the light receiving part generates a signal representing a state of light transmitted through the fiber, the pigtail, and the GRIN lens when the tube holder, the pigtail holder, and the rotation moving part are moved to the angle aligning part.

20. The apparatus according to claim 19, wherein the angle aligning part controls the rotation moving part to move the pigtail with respect to the glass tube in response to the signal.

21. The apparatus according to claim 10, wherein the spot aligning part comprises a light supplying part disposed to transmit light to the fiber and a light receiving part disposed to receive the light received from the GRIN lens and generate a signal representing a state of the light.

22. The apparatus according to claim 21, wherein the controller compares the signal with a reference value and controls the rotation moving part to move the rotation moving part in response to a result of the comparing of the signal with the reference value.

23. The apparatus according to claim 21, wherein the spot aligning part comprises a display device displaying an image representing the signal and the reference value.

* * * * *